United States Patent
Oda et al.

(10) Patent No.: US 10,020,878 B2
(45) Date of Patent: Jul. 10, 2018

(54) OPTICAL SIGNAL-TO-NOISE RATIO MONITOR AND METHOD FOR MEASURING OPTICAL SIGNAL TO-NOISE RATIO

(71) Applicant: FUJITSU LIMITED, Kawasaki-shi, Kanagawa (JP)

(72) Inventors: Shoichiro Oda, Fuchu (JP); Yasuhiko Aoki, Yokohama (JP); Hiroki Oi, Kawasaki (JP); Satoru Okano, Yokohama (JP); Yoichi Akasaka, Allen, TX (US); Jeng-Yuan Yang, Garland, TX (US)

(73) Assignee: FUJITSU LIMITED, Kawasaki (JP)

( * ) Notice: Subject to any disclaimer, the term of this patent is extended or adjusted under 35 U.S.C. 154(b) by 378 days.

(21) Appl. No.: 14/689,648

(22) Filed: Apr. 17, 2015

(65) Prior Publication Data
US 2016/0308611 A1 Oct. 20, 2016

(51) Int. Cl.
*H04B 10/08* (2006.01)
*H04B 10/079* (2013.01)
*H04J 14/06* (2006.01)

(52) U.S. Cl.
CPC ........ *H04B 10/07953* (2013.01); *H04J 14/06* (2013.01)

(58) Field of Classification Search
CPC ........ H04B 10/07953; H04B 10/07955; H04B 10/0775; H04B 10/0795; H04B 10/2572; H04B 10/532; H04B 10/60; H04B 10/612; H04B 10/6165; H04J 14/06

USPC ................ 398/26, 25, 27, 65, 152, 184, 205
See application file for complete search history.

(56) References Cited

U.S. PATENT DOCUMENTS

| | | | | |
|---|---|---|---|---|
| 6,433,864 B1 * | 8/2002 | Chung | ................. | H04B 10/077 356/73.1 |
| 6,952,529 B1 * | 10/2005 | Mittal | .............. | H04B 10/07953 398/25 |
| 7,239,807 B2 * | 7/2007 | Simard | ........... | H04B 10/07953 398/26 |
| 8,660,426 B2 * | 2/2014 | Dahan | .............. | H04B 10/07953 398/26 |
| 8,666,244 B2 * | 3/2014 | Bruno | .............. | H04B 10/07953 398/26 |
| 8,786,821 B2 * | 7/2014 | Shiraishi | ............... | G02F 1/0136 349/17 |

(Continued)

FOREIGN PATENT DOCUMENTS

| | | |
|---|---|---|
| JP | 2003-526232 | 9/2003 |
| JP | 2013-12834 | 1/2013 |
| WO | 00/69103 | 11/2000 |

*Primary Examiner* — Hibret Woldekidan
(74) *Attorney, Agent, or Firm* — Staas & Halsey LLP

(57) ABSTRACT

An optical signal-to-noise ratio monitor includes: a measuring unit that measures an optical signal-to-noise ratio of a polarization multiplexed optical signal, a polarization state of the polarization multiplexed optical signal changing with respect to time; a selector that selects, from a plurality of optical signal-to-noise ratios measured by the measuring unit at a plurality of measurement points within a designated measurement period, an optical signal-to-noise ratio that is higher than an average of the plurality of optical signal-to-noise ratios; and an output unit that outputs the optical signal-to-noise ratio selected by the selector.

9 Claims, 15 Drawing Sheets

(56) References Cited

U.S. PATENT DOCUMENTS

| | | | | |
|---|---|---|---|---|
| 8,989,572 B2* | 3/2015 | Tanimura | ............ | H04B 10/0775 |
| | | | | 398/30 |
| 9,413,455 B2* | 8/2016 | Oda | ................. | H04B 10/07953 |
| 9,621,263 B2* | 4/2017 | Wei | ................. | H04B 10/07953 |
| 2004/0114923 A1* | 6/2004 | Chung | ............. | H04B 10/07953 |
| | | | | 398/26 |
| 2010/0053615 A1* | 3/2010 | Angood | ................. | G01D 5/345 |
| | | | | 356/364 |
| 2012/0050844 A1* | 3/2012 | Nishihara | .......... | H04B 10/5053 |
| | | | | 359/337.13 |
| 2012/0063772 A1* | 3/2012 | Dahan | ............. | H04B 10/07953 |
| | | | | 398/26 |
| 2012/0301139 A1* | 11/2012 | Mori | ............... | H04B 10/07953 |
| | | | | 398/26 |
| 2013/0004162 A1 | 1/2013 | Osaka | | |
| 2013/0039650 A1* | 2/2013 | Sato | ................... | H04Q 11/0005 |
| | | | | 398/26 |
| 2013/0245985 A1* | 9/2013 | Flock | ................ | G03F 7/70625 |
| | | | | 702/105 |
| 2015/0110486 A1* | 4/2015 | Sunnerud | ................ | H04J 14/06 |
| | | | | 398/26 |
| 2015/0155935 A1* | 6/2015 | Oda | ................ | H04B 10/07953 |
| | | | | 398/26 |
| 2016/0056891 A1* | 2/2016 | Chen | ................ | H04B 10/07953 |
| | | | | 398/26 |

* cited by examiner

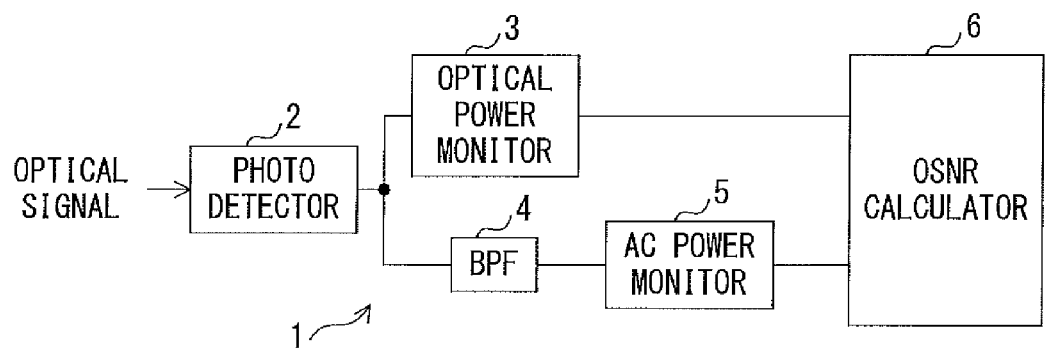
F I G. 1

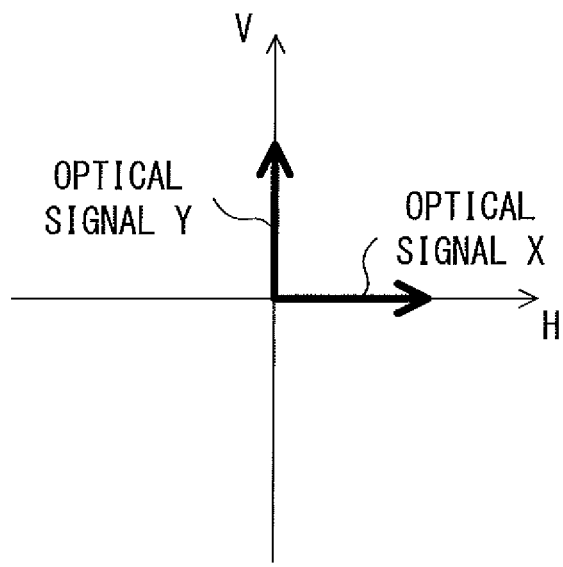
F I G. 3 A
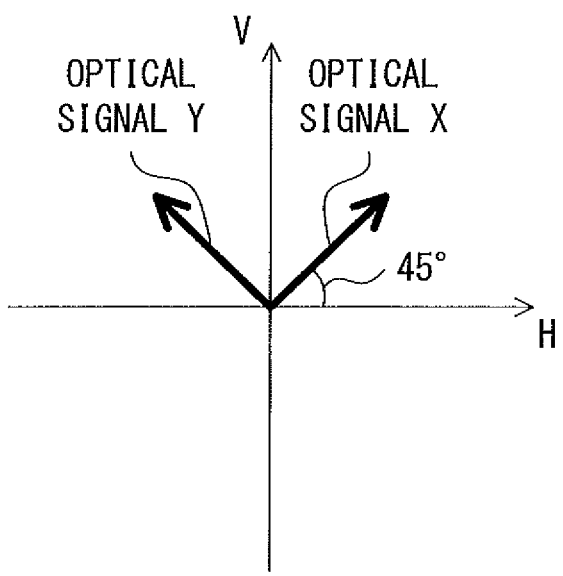
F I G. 3 B

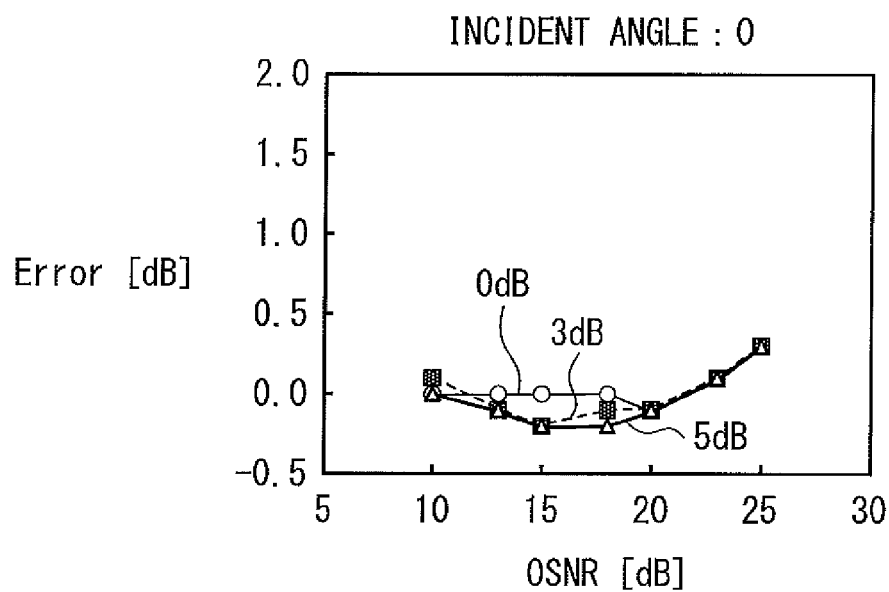
F I G. 4 A
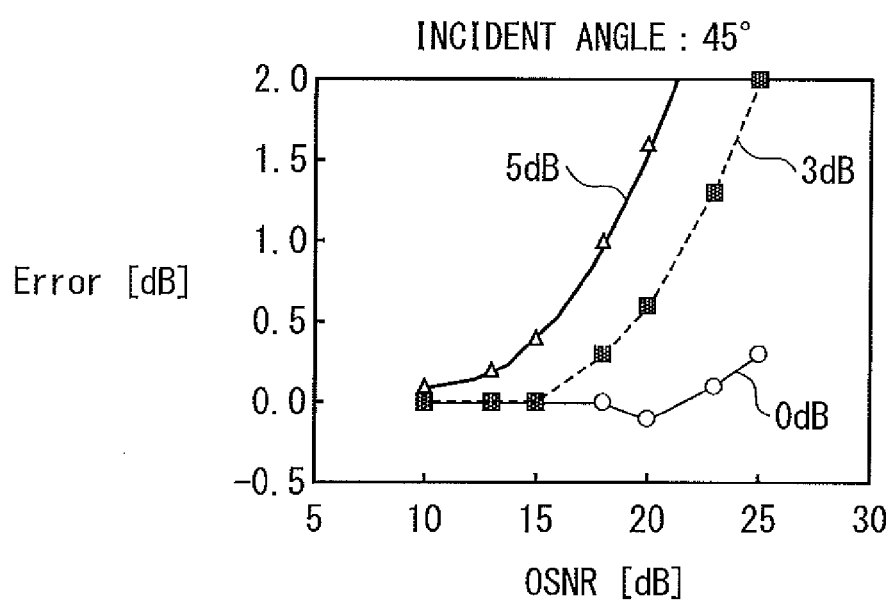
F I G. 4 B

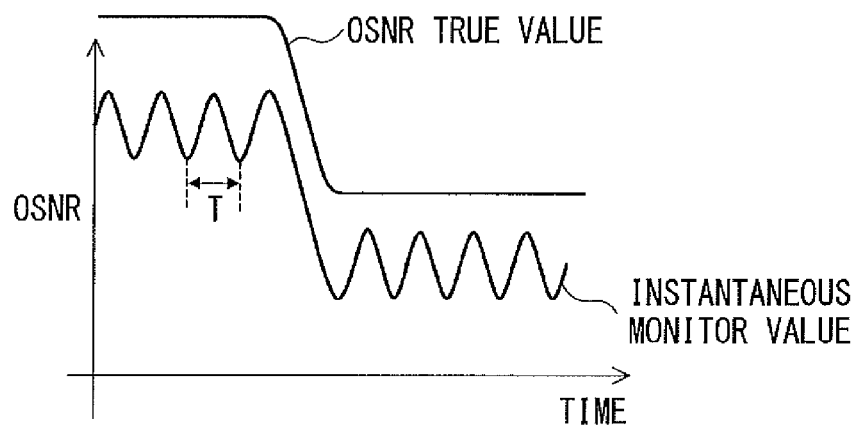
F I G. 6 A
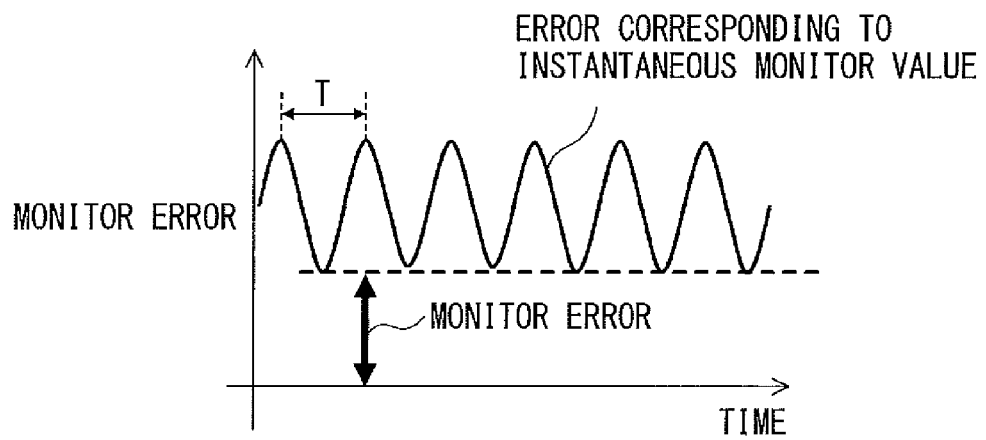
F I G. 6 B

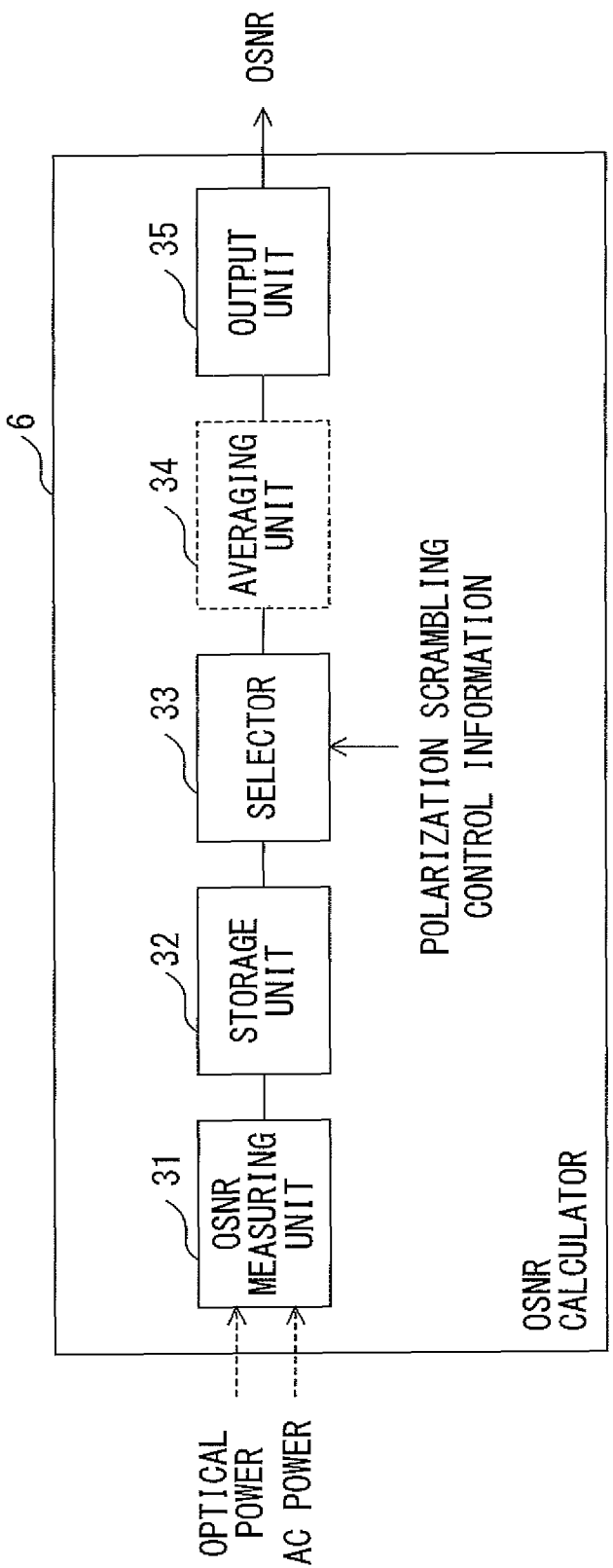
F I G. 8

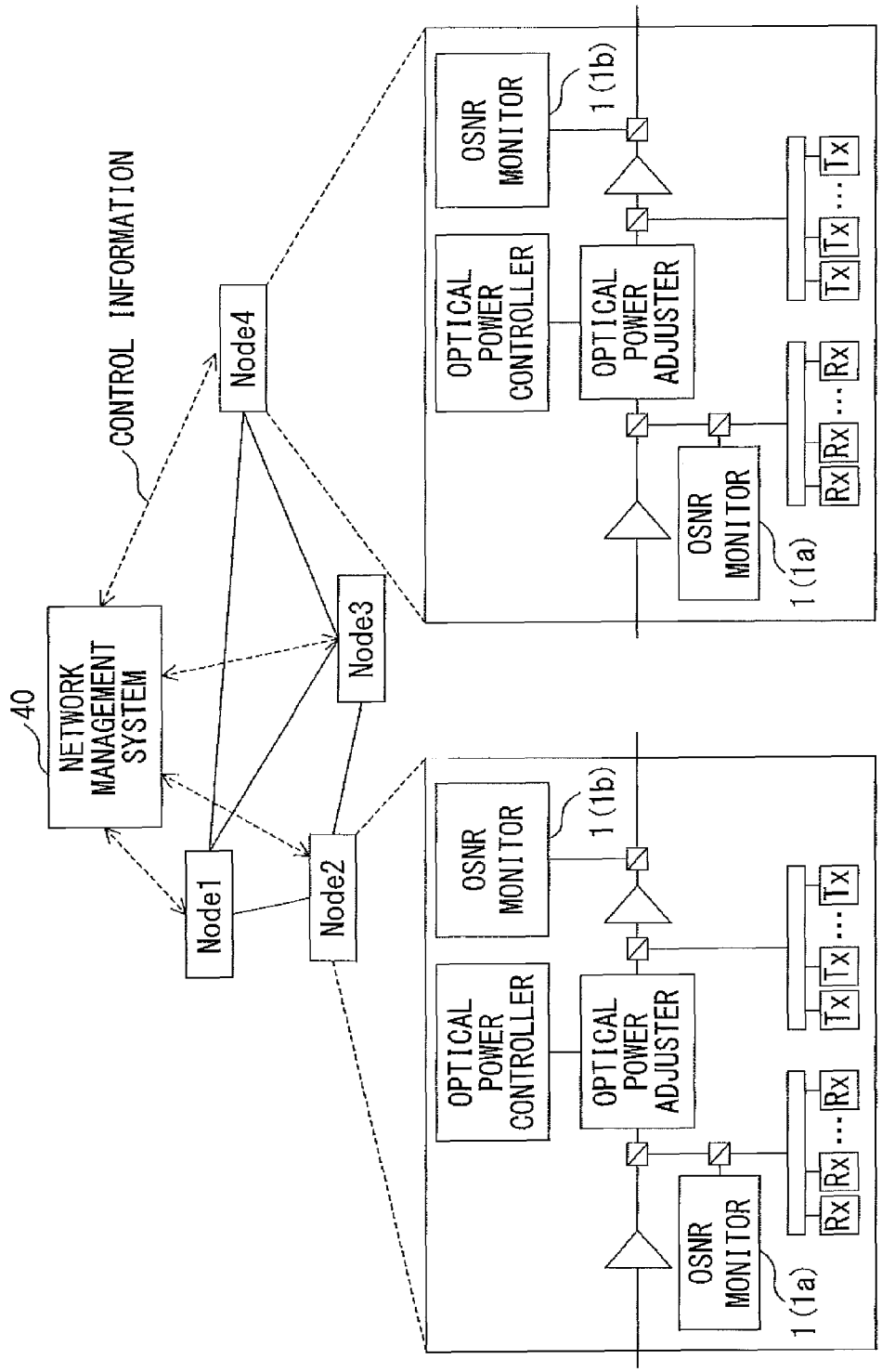
F I G. 1 0

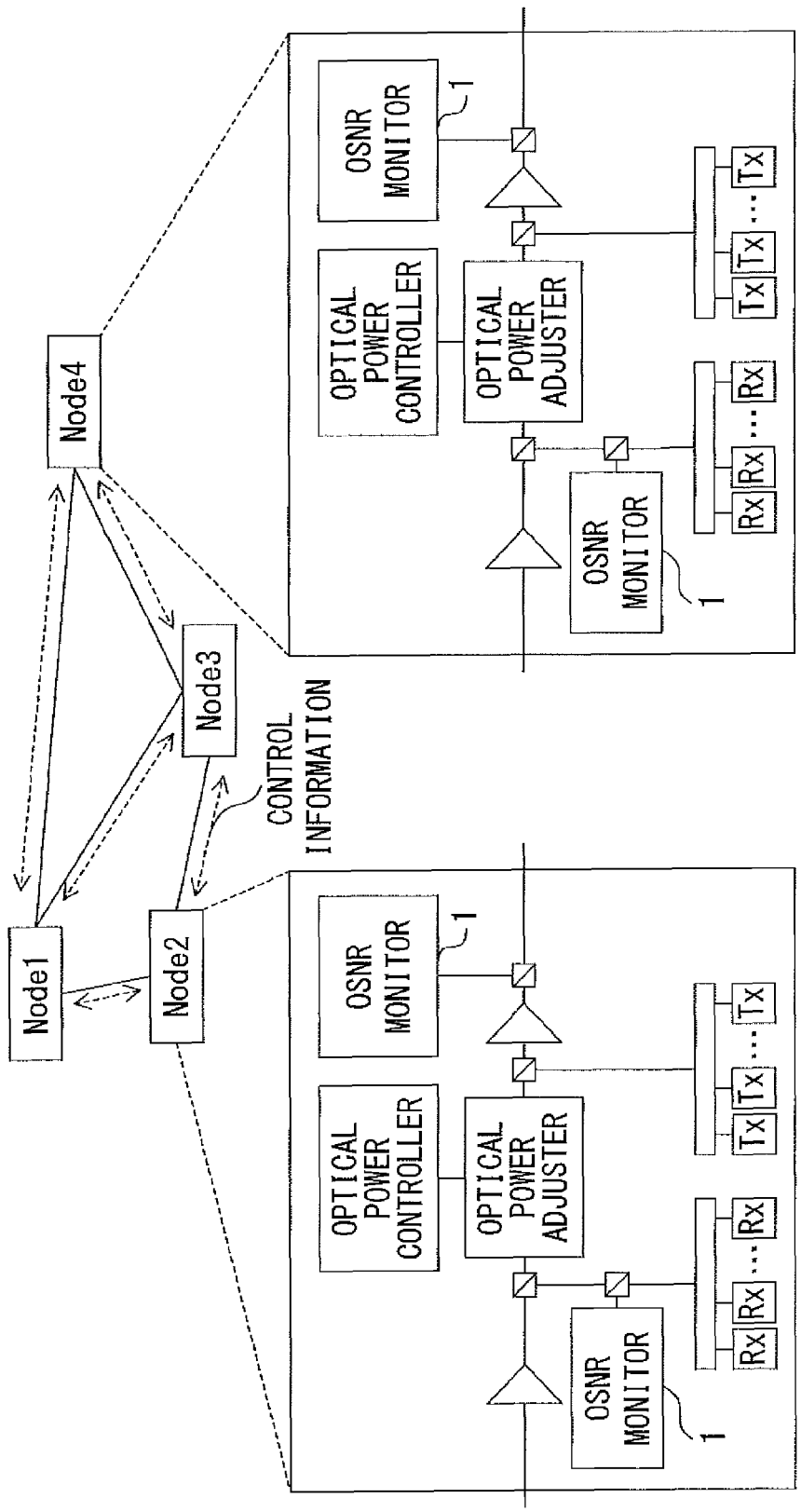
F I G. 11

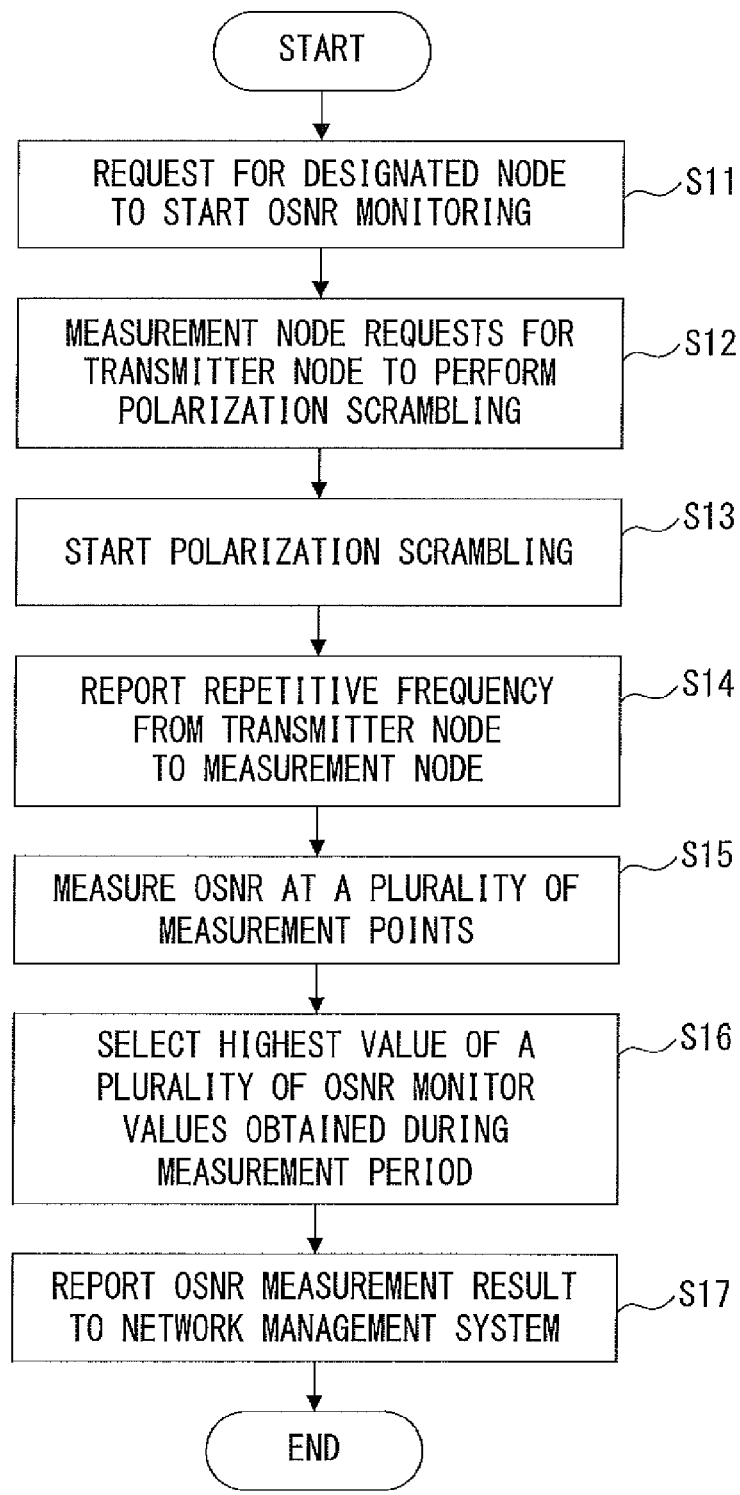
F I G. 1 3

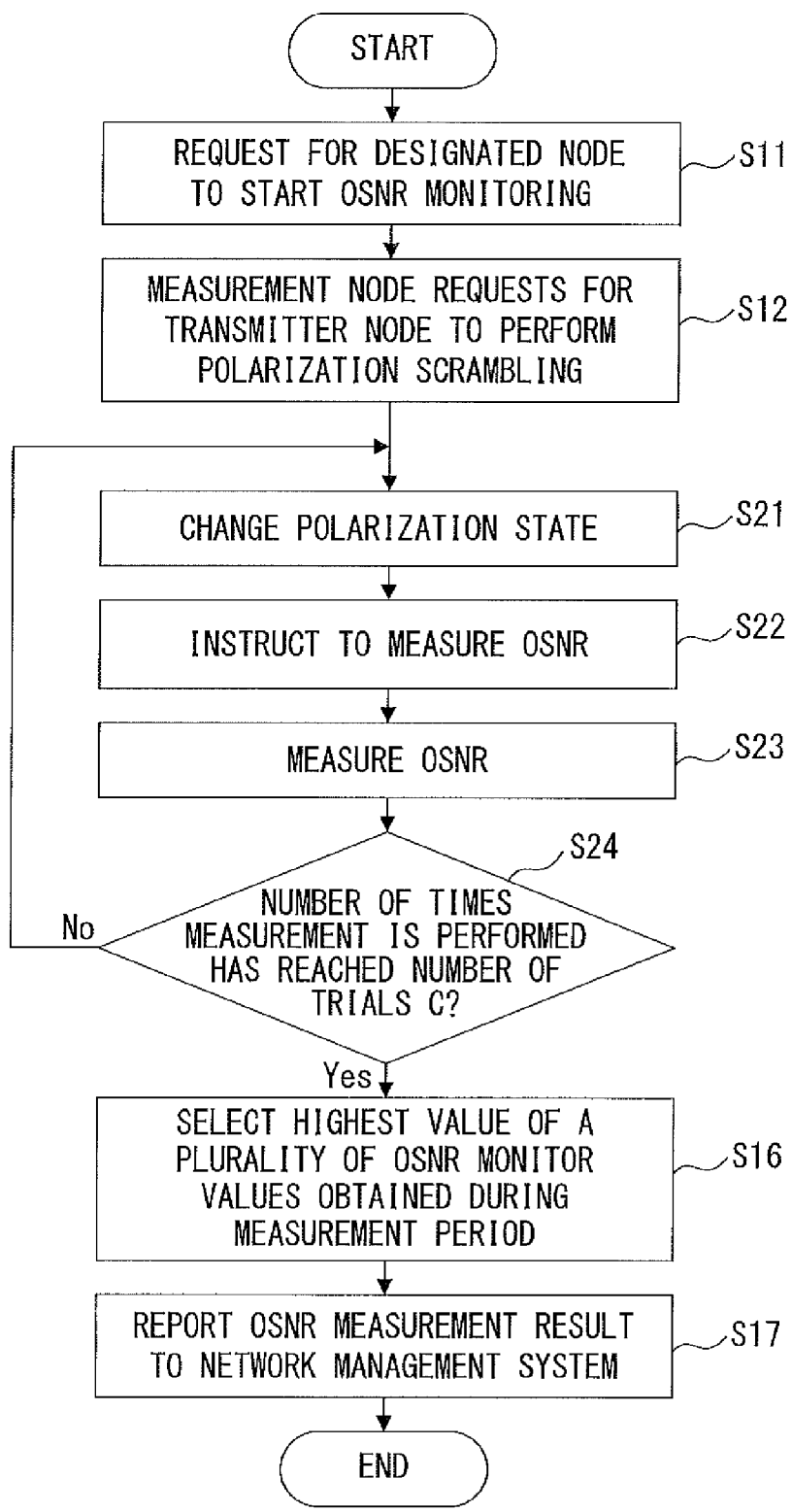
F I G. 14

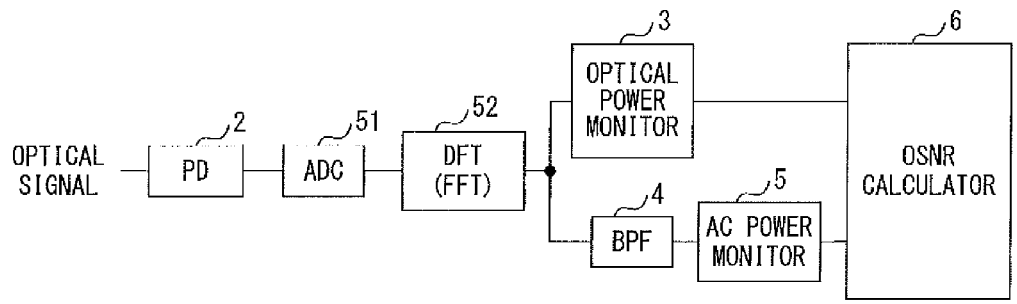
F I G. 1 5 A
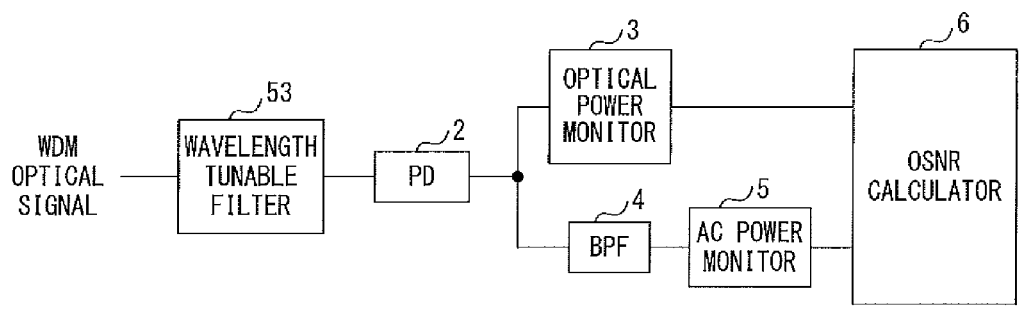
F I G. 1 5 B
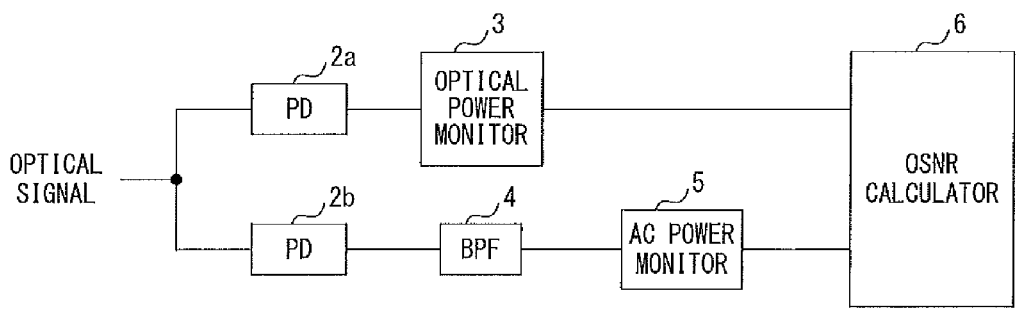
F I G. 1 5 C

OPTICAL SIGNAL-TO-NOISE RATIO MONITOR AND METHOD FOR MEASURING OPTICAL SIGNAL TO-NOISE RATIO

FIELD

The embodiments discussed herein are related to a device and method for monitoring an optical signal-to-noise ratio.

BACKGROUND

In optical transmission systems, devices have been put into practical use for monitoring an OSNR (Optical Signal-to-Noise Ratio) so as to detect the state or failure of, for example, an optical transmission device, an optical transceiver, or an optical path. In regard to a next-generation optical network, it is predicted that the wavelength channels and/or degrees of optical signals may be dynamically switched, and hence there will be a higher need for monitoring an optical signal quality.

In implementing an OSNR monitor, a main signal (e.g., optical signal for transmission of data) needs to be unaffected. Meanwhile, a specified monitoring accuracy is requested even for polarization multiplexed optical signal or an optical signal with dispersion (e.g., chromatic dispersion or polarization mode dispersion). Moreover, a simple and low-cost configuration is needed.

The following device is known as an exemplary OSNR monitor with a simple configuration. That is, an optical splitter guides optical signals to first and second paths. An optical power measuring unit measures the signal intensity of the optical signal on the first path. A noise measuring unit processes AC components of selectively passed optical signal on the second path and measures the noise intensity of the processed AC components. An OSNR calculator calculates the OSNR of the optical signal by comparing the measured signal intensity and the measured noise intensity. (See, for example, U.S. Pat. No. 6,433,864)

Note that Japanese National Publication of International Patent Application No. 2003-526232 and Japanese Laid-open Patent Publication No. 2013-12834 describe related arts.

In recent years, polarization multiplexing has been put into practical use as a technique for increasing the capacity of optical signals. Polarization multiplexing transmits data using a pair of polarized waves that are orthogonal to each other.

However, according to the simple configuration described above (e.g., configuration described in U.S. Pat. No. 6,433,864), an OSNR may be unable to be accurately measured depending on the state of polarization of optical signals. For example, according to the simple configurations described above, the accuracy of measurement of an OSNR may be decreased due to a PDL (Polarization Dependent Loss).

SUMMARY

According an aspect the embodiments, an optical signal-to-noise ratio monitor includes: a measuring unit that measures an optical signal-to-noise ratio of a polarization multiplexed optical signal, a polarization state of the polarization multiplexed optical signal changing with respect to time; a selector that selects, from a plurality of optical signal-to-noise ratios measured by the measuring unit at a plurality of measurement points within a designated measurement period, an optical signal-to-noise ratio that is higher than an average of the plurality of optical signal-to-noise ratios; and an output unit that outputs the optical signal-to-noise ratio selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary configuration of an OSNR monitor;

FIGS. 3A and 3B illustrate an incident angle of a polarization of an optical signal with respect to a polarization axis of a PDL;

FIGS. 4A and 4B illustrate monitor error with respect to an incident angle of a polarization of an optical signal;

FIGS. 6A and 6B illustrate an outline of an OSNR measurement method;

FIG. 8 illustrates functions of an OSNR calculator;

FIG. 10 illustrates an example of a network in which an OSNR monitor is used;

FIG. 11 illustrates another example of a network in which an OSNR monitor is used;

FIG. 13 is a flowchart illustrating another example of an OSNR measurement method;

FIG. 14 is a flowchart illustrating yet another example of an OSNR measurement method; and FIGS. 15A-15C illustrate variations of an OSNR monitor.

DESCRIPTION OF EMBODIMENTS

Figure 2:
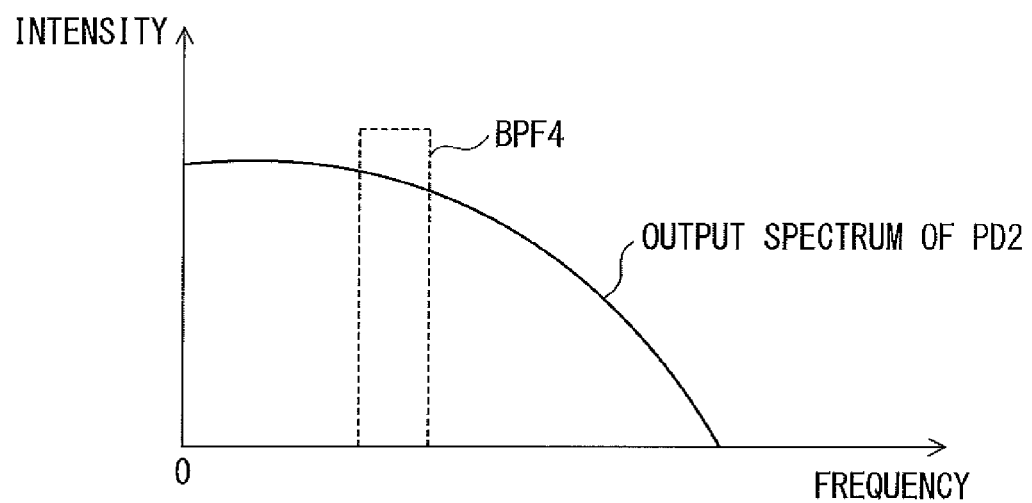
FIG. 2 schematically illustrates an output spectrum of a photodetector.

FIG. 1 illustrates an exemplary configuration of an optical signal-to-noise ratio monitor (hereinafter referred to as an OSNR monitor) in accordance with an embodiment of the invention. As depicted in FIG. 1, an OSNR monitor 1 in accordance with the embodiment includes a photodetector 2, an optical power monitor 3, a BPF (Band Pass Filter) 4, an AC power monitor 5, and an OSNR calculator 6. The OSNR monitor 1 is provided at, for example, each node within a network for transmission of optical signals. In this case, the OSNR monitor 1 monitors the OSNR of an optical signal transmitted from another node.

The photodetector 2 converts a received optical signal into an electrical signal. That is, the photodetector 2 generates an electrical signal representing the received optical signal. However, a noise component has been added to the received optical signal. Hence, the electrical signal output from the photodetector 2 includes a noise component. An output spectrum of the photodetector 2 is depicted in FIG. 2. Note that FIG. 2 schematically illustrates the output spectrum.

The optical power monitor 3 detects the intensity of the received optical signal according to the electrical signal generated by the photodetector 2. That is, the power of the received optical signal is detected. As depicted in FIG. 2, the BPF 4 extracts components of a specified frequency band other than DC component from the output signal of the photodetector 2. That is, the BPF 4 extracts a part of the AC components of the output signal of the photodetector 2. The BPF 4 has a center frequency of a passband of, for example, 100 kHz to 1 MHz. The bandwidth of the passband of the BPF 4 is, for example, several kHz to several dozen kHz. The AC power monitor 5 detects the intensity of an AC component extracted by the BPF 4. An intensity detected by the BPF 4 and the AC power monitor 5 according to the electrical signal generated by the photodetector 2 may hereinafter be referred to as an "intensity of an AC component of a received optical signal". That is, the BPF 4 and the AC power monitor 5 detect the intensity of an AC component of a received optical signal according to the electrical signal generated by the photodetector 2. According to the intensity of the received optical signal and the intensity of an AC component of the received optical signal, the OSNR calculator 6 calculates an OSNR of the optical signal.

A noise intensity $N_{total}$ is expressed by the following formula.

$$N_{total} = N_{beat} + N_{shot} + N_{thermal} + N_{circuit} + N_{signal}$$

$$= N_{beat} + N_{nonbeat}$$

$N_{beat}$ indicates a noise component that depends on an OSNR. $N_{shot}$ indicates shot noise. $N_{thermal}$ indicates thermal noise. $N_{circuit}$ indicates circuit noise. $N_{signal}$ indicates noise generated by an optical signal itself while a photodetector detects noise. $N_{shot}$, $N_{thermal}$, $N_{circuit}$, and $N_{signal}$ do not depend on an OSNR and can be respectively obtained by, for example, measurement. $N_{total}$ can be calculated according to the intensity of an AC component detected by the AC power monitor 5. Accordingly, the OSNR calculator 6 may obtain $N_{beat}$ according to the intensity of the AC component detected by the AC power monitor 5.

Formulae (1) and (2) express a relationship between $N_{beat}$ and an OSNR.

$$P_{total} = P_{sig} + P_{ase} \quad (1)$$

$$= P_{sig}\left(1 + \frac{1}{OSNR}\frac{B_o}{R}\right)$$

$$N_{beat} = A\left(2P_{sig}P_{ase}\frac{1}{B_o} + P_{ase}^2\frac{1}{B_o}\right) \quad (2)$$

$$= 2\frac{A}{R}P_{sig}^2\left(\frac{1}{OSNR} + \frac{B_o}{2R \cdot OSNR^2}\right)$$

$P_{total}$ indicates the intensity of a received optical signal and is detected by the optical power monitor 3. $P_{sig}$ indicates a signal intensity. $P_{sig}$ can be calculated according to, for example, a DC component of an output signal of the photodetector 2. $P_{ase}$ indicates the intensity of ASE light. $B_o$ indicates the bandwidth of an optical signal. R indicates a resolution of the photodetector 2. A indicates a constant related to a characteristic of an amplifier. That is, $B_o$, R, and A are known constants respectively. Accordingly, the OSNR calculator 6 can calculate an OSNR according to the intensity of an optical signal detected by the optical power monitor 3. A method for calculating an OSNR according to the intensity of a received optical signal and the intensity of an AC component of the received optical signal is described by, for example, U.S. Pat. No. 6,433,864.

However, when a polarization multiplexed optical signal is received, simply performing the operations of formulae (1) and (2) above may be insufficient to accurately measure an OSNR. For example, the accuracy of measurement of an OSNR may be decreased due to a PDL (Polarization Dependent Loss).

FIGS. 3A and 3B illustrate an incident angle of a polarization of an optical signal with respect to a polarization axis of a PDL. In FIGS. 3A and 3B, the polarization axis of a PDL is represented as an H axis and a V axis. The H axis and the V axis are orthogonal to each other. The PDL is represented by an optical loss on the H axis (h[dB]) and an optical loss on the V axis (v[dB]). "PDL=A[dB]" indicates a state wherein the difference between a loss on the H axis and a loss on the V axis is A [dB]. The H axis and the V axis depend on, for example, a characteristic and implementation of optical devices for transmitting an optical signal.

A polarization multiplexed optical signal is generated by multiplexing optical signals X and Y. The optical signal X is propagated using an X polarization, and the optical signal Y is propagated using a Y polarization. The X polarization and the Y polarization are orthogonal to each other. Hereinafter, as illustrated in FIG. 3A, "incident angle=0 degree" indicates that the X polarization propagating the optical signal X coincides with one of the H axis and the V axis and that the Y polarization propagating the optical signal Y coincides with the other of the H axis and the V axis. In the example depicted in FIG. 3A, the X polarization propagating the optical signal X coincides with the H axis, and the Y polarization propagating the optical signal Y coincides with the V axis. In this case, the optical signal X is attenuated by h[dB], and the optical signal Y is attenuated by v[dB].

FIG. 3B illustrates an example of "incident angle=45 degrees". In this example, the X polarization propagating the optical signal X and the H axis form an angle of 45 degrees, and the Y polarization propagating the optical signal Y and the V axis form an angle of 45 degrees. When the incident angle of the input optical signal is not zero, components of the optical signal X and components of the optical signal Y are combined in each polarization according to the PDL. That is, the X polarization includes components of the optical signal X and components of the optical signal Y, and the Y polarization includes components of the optical signal Y and components of the optical signal X. Consequently, a beat signal component is generated between the X polarization and the Y polarization. In formulae (1) and (2), the beat signal component emerges as noise that depends on an OSNR. Accordingly, a larger beat signal component that depends on the incident angle of the optical signal causes a lower OSNR monitor value.

FIGS. 4A and 4B illustrate monitor error with respect to an incident angle of a polarization of an optical signal. The monitor error indicates "OSNR true value−OSNR monitor value". The OSNR true value indicates an actual OSNR. The OSNR monitor value is calculated by the OSNR monitor 1 depicted in FIG. 1 according to formulae (1) and (2) described above. Note that FIGS. 4A and 4B depicts monitor error based on measurements for PDL=0, 3 dB, and 5 dB.

When the incident angle of a polarization of an optical signal is zero with respect to the polarization axis of a PDL, the monitor error is almost zero as depicted in FIG. 4A. However, when the incident angle of a polarization of an optical signal is 45 degrees with respect to the polarization axis of the PDL, the monitor error becomes unignorable as depicted in FIG. 4B. In particular, a large PDL causes a large monitor error. For the range of the incident angle of the polarization that is from zero to 90 degrees, the monitor error tends to become the largest when the incident angel of the polarization is 45 degrees. The monitor error tends to become the smallest when the incident angel of the polarization is zero or 90 degrees.

As described above, the monitor error depends on the incident angle of the polarization of the optical signal with respect to the polarization axis of the PDL. Accordingly, in an OSNR measurement method in accordance with the embodiment, an OSNR is measured at a plurality of measurement points while changing a polarization of an optical signal. An OSNR measured at a measurement point expected to correspond to a small monitor error is output as an OSNR measurement value.

Figure 5:
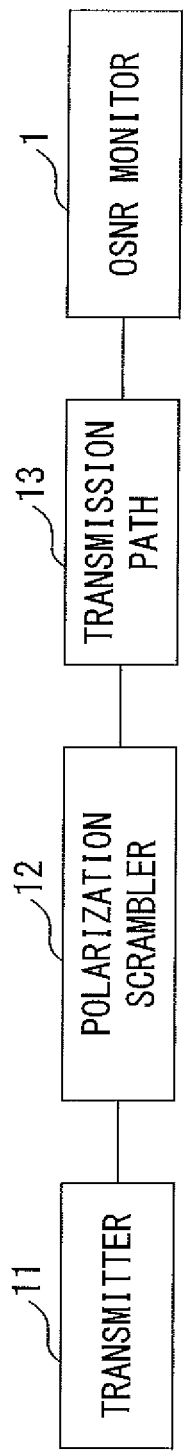
FIG. 5 illustrates an exemplary configuration for achieving an OSNR measurement method.

FIG. 5 illustrates an exemplary configuration for achieving an OSNR measurement method in accordance with an embodiment. In the OSNR measurement method in accordance with the embodiment, a transmitter 11 generates a polarization multiplexed optical signal. A polarization scrambler 12 applies polarization scrambling to an optical signal generated by the transmitter 11. For example, the polarization scrambler 12 rotates a polarization of the optical signal at a constant speed. Then, the optical signal to which polarization scrambling has been applied is transmitted to the OSNR monitor 1 via a transmission path 13.

FIGS. 6A and 6B illustrate an outline of an OSNR measurement method in accordance with an embodiment. In the example depicted in FIG. 6, the polarization scrambler 12 rotates a polarization of an optical signal at a constant speed. As described above, an OSNR monitor value changes with the incident angle of the polarization of the optical signal. Accordingly, when the polarization of the optical signal is rotated at a constant speed by polarization scrambling, an OSNR monitor value (instantaneous monitor value) periodically varies on a constant cycle, as depicted in FIG. 6A. Note that a cycle T depicted in FIG. 6A corresponds to the period of time in which the polarization of the optical signal is rotated by $\pi/2$ according to polarization scrambling.

As described above, a monitor error indicates a difference between an OSNR true value and an OSNR monitor value. Accordingly, when a polarization of an optical signal is rotated at a constant speed by polarization scrambling, a monitor error periodically varies on the constant cycle T, as depicted in FIG. 6B. In particular, when the OSNR monitor value is high, the monitor error is small, and when the OSNR monitor value is low, the monitor error is large.

The OSNR monitor 1 outputs an OSNR monitor value (i.e., instantaneous monitor value) obtained when the OSNR monitor value reaches a peak or local maximum. In this case, the OSNR monitor 1 may obtain OSNR monitor values at a plurality of measurement points within the cycle T, and output the highest OSNR monitor value among the plurality of OSNR monitor values obtained. Consequently, the monitor error is suppressed or minimized.

When an OSNR is measured without performing polarization scrambling, a calculated OSNR monitor value depends on the incident angle of the polarization of the optical signal with respect to the polarization axis of the PDL. Accordingly, when the incident angle of the polarization of the optical signal coincides with the polarization axis of the PDL, a peak or local maximum of the instantaneous monitor value depicted in FIG. 6A is detected, however, in a worst case, a local minimum of the instantaneous monitor value is detected. That is, depending on, for example, the configuration and environment of a system to which the optical signal is transmitted, a monitor error becomes large. By contrast, in the OSNR measurement method of the embodiment, the monitor error decreases since an OSNR monitor value with a small noise component caused by a PDL is detected.

Figure 7A:
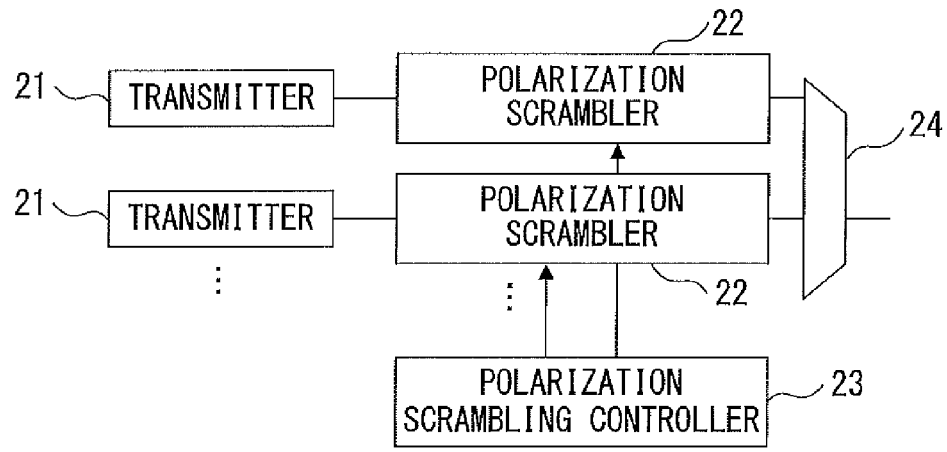
FIGS. 7A-7C illustrate examples of a transmitter circuit that generates and transmits an optical signal.
Figure 7B:
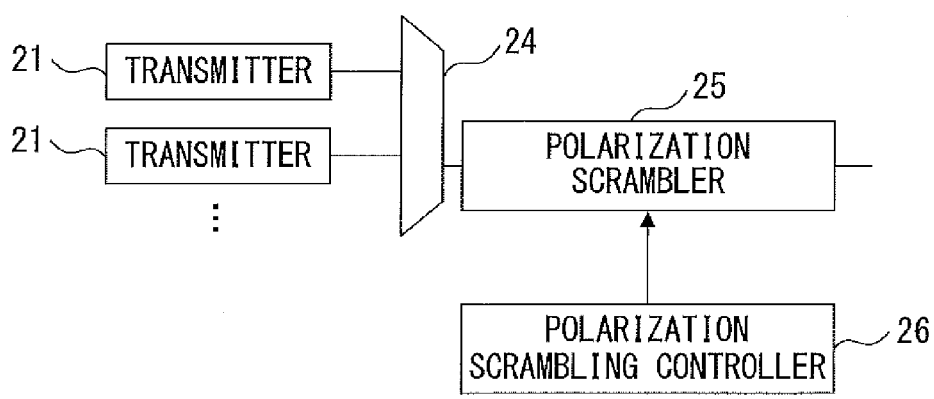
Figure 7C:
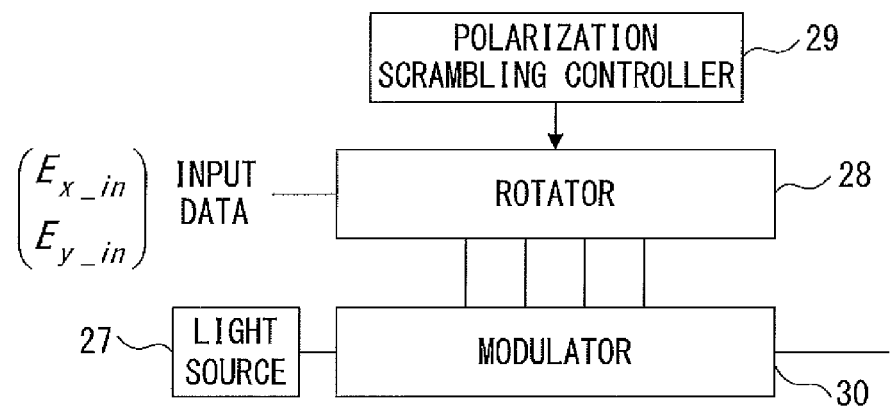

FIGS. 7A-7C illustrate examples of a transmitter circuit that generates and transmits an optical signal. Three examples will be described with reference to FIGS. 7A-7C.

A transmitter circuit depicted in FIG. 7A includes a plurality of optical transmitters 21, a plurality of polarization scramblers 22, a polarization scrambling controller 23, and a wavelength combiner 24. The optical transmitters 21 respectively generate polarization multiplexed optical signals. The wavelengths of the plurality of optical signals generated by the plurality of optical transmitters 21 are different from each other. In accordance with an instruction from the polarization scrambling controller 23, each of the polarization scrambler 22 applies polarization scrambling to an optical signal generated by a corresponding optical transmitter 21. The polarization scrambler 22 may be implemented by using a publicly known art. The polarization scrambling controller 23 gives an instruction to each of the polarization scramblers 22. The polarization scrambling controller 23 may give an instruction to each of the polarization scramblers 22 as to whether to perform polarization scrambling. The polarization scrambling controller 23 may designate a scrambling pattern for each of the polarization scramblers 22. For example, the polarization scrambling controller 23 gives a polarization scrambler 22 an instruction such that a polarization of an optical signal rotates at a constant speed. The wavelength combiner 24 combines the plurality of optical signals to generate a WDM optical signal.

According to the configuration illustrated in FIG. 7A, it may be controlled whether to perform polarization scrambling for each wavelength channel. Hence, while monitoring an OSNR of a certain wavelength channel, polarization scrambling does not need to be applied to another wavelength channel.

A transmitter circuit depicted in FIG. 7B includes a plurality of optical transmitters 21, a wavelength combiner 24, a polarization scrambler 25, and a polarization scrambling controller 26. In the transmitter circuit depicted in FIG. 7B, the polarization scrambler 25 applies polarization scrambling to a WDM optical signal output from the wavelength combiner 24. The polarization scrambling controller 26 gives an instruction to the polarization scrambler 25. In this configuration, a polarization scrambler does not need to be provided for each wavelength channel. Thus, comparing with the configuration illustrated in FIG. 7A, a smaller and/or lower-cost transmitter circuit may be implemented.

In the examples depicted in FIGS. 7A and 7B, polarization scrambling is applied to an optical signal. In the example illustrated in FIG. 7C, polarization scrambling is performed within an optical transmitter. That is, a light source 27 outputs continuous wave light of a specified wavelength. A rotator 28 applies rotational transform to an input data signal in accordance with an instruction from a polarization scrambling controller 29. The rotational transform applied by the rotator 28 is represented by, for example, the following formula.

$$\begin{pmatrix} E_{x\_out} \\ E_{y\_out} \end{pmatrix} = \begin{pmatrix} \cos \omega t & -\sin \omega t \\ \sin \omega t & \cos \omega t \end{pmatrix} \begin{pmatrix} E_{x\_in} \\ E_{y\_in} \end{pmatrix} \quad (3)$$

Ex_out and Ey_out indicate output signals from the rotator 28. ω indicates an angular speed corresponding to the cycle T depicted in FIGS. 6A and 6B.

The polarization scrambling controller 29 gives an instruction to the rotator 28. An optical modulator 30 modulates the continuous wave light output from the light source 27 using an output signal from the rotator 28 so as to generate a polarization multiplexed optical signal to which polarization scrambling has been applied. Note that Japanese Laid-open Patent Publication No. 2010-109705 describes a configuration and method wherein polarization scrambling is achieved by applying rotational transform to a driving signal for an optical modulator.

FIG. 8 illustrates functions of the OSNR calculator 6. As depicted in FIG. 8, the OSNR calculator 6 includes an OSNR measuring unit 31, a storage unit 32, a selector 33, an averaging unit 34, and an output unit 35. However, in some cases, the OSNR calculator 6 does not include the averaging unit 34. The OSNR calculator 6 may be implemented by, for example, a processor system that includes a processor element and a memory. In this case, the processor system executes a given program so as to provide the functions of the OSNR calculator 6. However, a hardware circuit may achieve some of the functions of the OSNR calculator 6.

The OSNR measuring unit 31 calculates an OSNR of a received optical signal according to the intensity of the received optical signal and the intensity of an AC component of the received optical signal. The intensity of the received optical signal is detected by the optical power monitor 3 illustrated in FIG. 1. The intensity of the AC component of the received optical signal is detected by the BPF 4 and AC power monitor 5 illustrated in FIG. 1. The OSNR measuring unit 31 calculates the OSNR according to, for example, the formulae (1) and (2) described above.

The OSNR measuring unit 31 calculates an OSNR at a plurality of measurement points within a designated measurement period. When, for example, a polarization of an optical signal is continuously rotated by the polarization scrambler, an instantaneous OSNR monitor value has at least one peak during a period of time in which the polarization of the optical signal rotates by $\pi/2$. Accordingly, when a polarization of an optical signal is rotated at a constant speed by the polarization scrambler, at least one peak OSNR can be detected during a period of time in which the polarization of the optical signal rotates by $\pi/2$. Hence, in this case, the measurement period may be longer than or equal to a period of time in which the polarization of the optical signal rotates by $\pi/2$. To shorten the monitoring time, it is preferable that the measurement period is equal to a period of time in which the polarization of the optical signal rotates by $\pi/2$.

Figure 9:
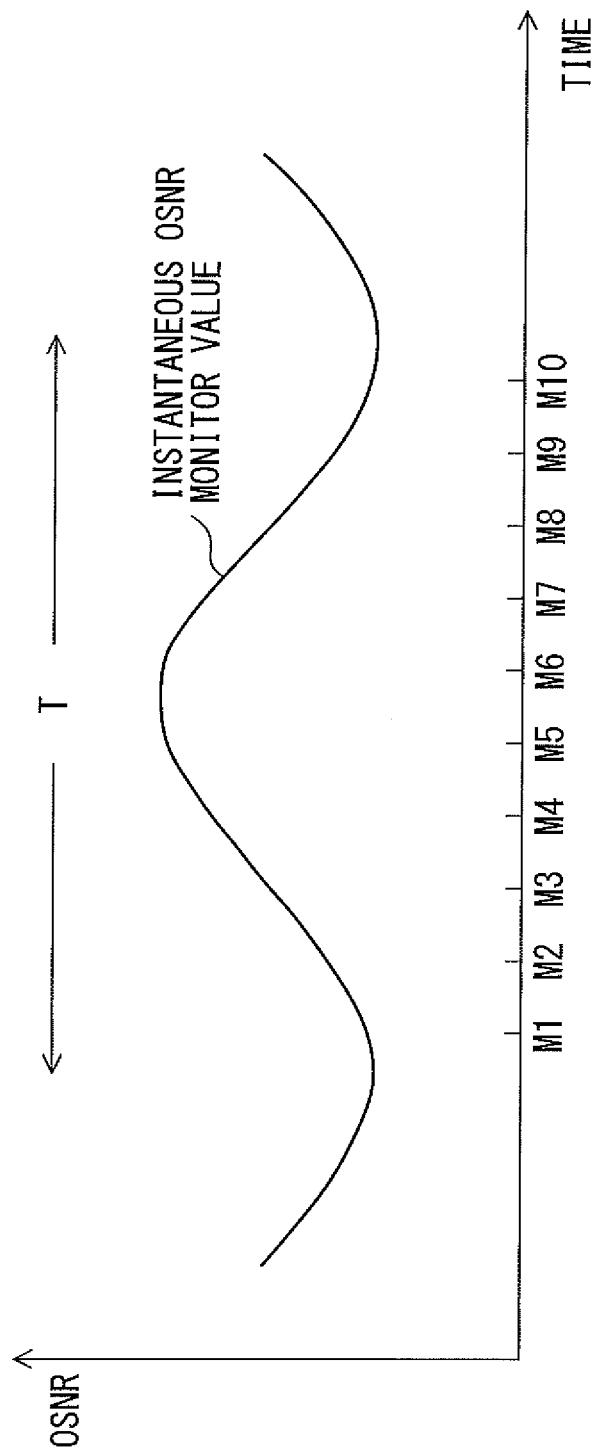
FIG. 9 illustrates a polarization scrambling cycle and measurement points of an OSNR monitor.

The number of measurement points within a measurement period depends on, for example, a monitoring accuracy and a monitoring time. If the number of measurement points within a measurement period is too small, a desired monitoring accuracy is not obtained. Meanwhile, many measurement points within a measurement period causes a long monitoring time. In one example, to ensure a desired monitoring accuracy, ten or more measurement points are provided within the measurement period. To prevent the monitoring time from becoming long, twenty or less measurement points are provided within the measurement period. In the example illustrated in FIG. 9, ten measurement points M1-M10 are provided within a measurement period T. The plurality of measurement points within the measurement period are preferably arranged at regular intervals.

The storage unit 32 stores OSNR monitor values calculated by the OSNR measuring unit 31. In this case, a plurality of OSNR monitor values calculated by the OSNR measuring unit 31 are sequentially stored in the storage unit 32. In the example depicted in FIG. 9, ten OSNR monitor values obtained at the measurement points M1-M10 are sequentially stored in the storage unit 32.

The selector 33 selects an OSNR monitor value from the plurality of OSNR monitor values stored in the storage unit 32 according to a given conditions. In this case, the selector 33 receives control information indicating the length of the measurement period and control information indicating the number of measurement points within the measurement period. The control information indicating the length of the measurement period may be information indicating a repetition frequency of polarization scrambling. The selector 33 selects the highest OSNR monitor value from the plurality of OSNR monitor values obtained during the measurement period. In the example depicted in FIG. 9, the selector 33 selects the highest OSNR monitor value from the ten OSNR monitor values obtained at the measurement points M1-M10.

Note that the selector 33 does not necessarily select the highest OSNR monitor value. For example, the selector 33 may select the second highest OSNR monitor value from the plurality of OSNR monitor values within the measurement period. The selector 33 may select two or more OSNR monitor values from the plurality of OSNR monitor values within the measurement period. In this case, the selector 33 may output the average of the plurality of selected OSNR monitor values. However, it is preferable that the selector 33 select, from a plurality of OSNR monitor values within the monitoring period, an OSNR monitor value that is higher than the average of the plurality of OSNR monitor values.

In a case where the OSNR calculator 6 does not include the averaging unit 34, the output unit 35 outputs the OSNR monitor value selected by the selector 33 as an OSNR of the received optical signal. On the other hand, in a case where the OSNR calculator 6 includes the averaging unit 34, the output unit 35 outputs a calculation result obtained by the averaging unit 34 as an OSNR of the received optical signal.

In a case where the OSNR calculator 6 includes the averaging unit 34, the selector 33 selects an OSNR monitor value for each measurement period. In this case, the selector 33 selects, for example, the highest OSNR monitor value for each measurement period. The averaging unit 34 calculates the average of a plurality of OSNR monitor values selected by the selector 33. The output unit 35 outputs the value calculated by the averaging unit 34 as an OSNR of the received optical signal.

As described above, in the OSNR measurement method in accordance with the embodiment, polarization scrambling is applied to an optical signal, and the OSNR monitor outputs a value obtained when an instantaneous OSNR monitor value reaches a peak as OSNR of the optical signal. A noise component caused by a PDL is expected to be minimized when the instantaneous OSNR monitor value reaches a peak. Accordingly, the OSNR measurement method in accordance with the embodiment can obtain an OSNR in which the influence of a PDL is suppressed. That is, the OSNR measurement method in accordance with the embodiment decreases a monitor error caused by a PDL.

The incident angle of a polarization of an optical signal with respect to the polarization axis of a PDL is expected to be zero or almost zero when the instantaneous OSNR monitor value reaches a peak. That is, an OSNR monitor value selected by the selector 33 corresponds to an instantaneous OSNR monitor value obtained when the incident angle of the polarization of the optical signal with respect to the polarization axis of PDL is zero or almost zero. Accordingly, when the OSNR is obtained using the OSNR measurement method in accordance with the embodiment, an error caused by a PDL is small, as illustrated in FIG. 4A.

Operations of the OSNR monitor 1 may depend on a polarization scrambling pattern. The following descriptions are based on a situation in which polarization scrambling is performed such that a polarization of an optical signal rotates at a constant speed. The period of time in which a polarization of an optical signal rotates by $\pi/2$ will hereinafter be referred to as a "polarization scrambling cycle T".

In this example, a measurement period for an OSNR is the polarization scrambling cycle T. Let "n" indicate the number of times the OSNR is measured during the measurement period. Then an OSNR monitoring frequency B for performing the OSNR measurement is expressed by the following formula.

$$B=n/T$$

Note that in order to accurately and efficiently detect a peak of the instantaneous OSNR monitor value, n (the number of times the OSNR is measured during the measurement period) is preferably from 10 to 20.

The BPF 4 and the AC power monitor 5 may be implemented to include an FFT circuit. In this case, it is preferable that an FFT time is sufficiently short relative to the period of time in which the OSNR measurement is performed once (1/B).

$$1/B<<N/f$$

N indicates the number of FFT points. f indicates a sampling frequency of FFT.

On example is described below.
Polarization scrambling cycle T: 100 ms
OSNR monitoring frequency B: 100 times/s (n=10)
FFT sampling frequency f: 1 MHz
FFT sampling points: 1024

In the example above, polarization scrambling causes the polarization of the optical signal to rotate at a constant speed, but the invention is not limited to such a method. For example, the polarization of the optical signal may be discretely changed. In this case, an OSNR is measured for each of a plurality of different polarization states. Let "C" indicate the number of different polarization states. Accordingly, polarization scrambling is performed to, for example, discretely change the incident angle of the polarization of the optical signal by $\pi/2C$ each time. C is, for example, from 10 to 20.

The period of time in which an OSNR is measured for one polarization state corresponds to N/f described above. Hence, the OSNR monitoring time is 10.24 ms, where FFT sampling frequency f=1 MHz, FFT sampling points=1024, and C=10.

FIG. 10 illustrates an example of a network in which an OSNR monitor is used. As illustrated in FIG. 10, the OSNR monitor 1 is installed in each node within the network system. For example, an OSNR monitor 1a monitors an OSNR of a WDM signal received from another node. An OSNR monitor 1b monitors an OSNR of a WDM signal that includes an optical signal passing through the node and an added optical signal.

A network management system 40 controls the state and operation of the network system. For example, the network management system 40 may instruct a desired node to measure an OSNR.

When measuring an OSNR, the network management system 40 designates a transmitter node and a measurement node. The network management system 40 gives a polarization scrambling instruction to the transmitter node and gives a measurement instruction to the measurement node.

Upon receipt of the polarization scrambling instruction, the transmitter node applies polarization scrambling to a transmission optical signal. The transmitter node also reports control information indicating a cycle of polarization scrambling (or repetition frequency of polarization scrambling) to the network management system 40. Then, the network management system 40 reports the control information to the measurement node. Meanwhile, upon receipt of the measurement instruction, the measurement node activates an OSNR monitor. Subsequently, the measurement node identifies the cycle of polarization scrambling according to the control information reported from the network management system 40. That is, the OSNR monitor 1 of the measurement node determines a measurement period according to the cycle of polarization scrambling and calculates an OSNR of the optical signal from a plurality of OSNR monitor values measured during the measurement period. In this way, in the example depicted in FIG. 10, control information needed to measure an OSNR is shared between a transmitter node and a measurement node via the network management system 40.

FIG. 11 illustrates another example of a network system in which an OSNR monitor is used. A method for measuring an OSNR in the example of FIG. 11 is substantially identical with that in the example of FIG. 10. However, in the example depicted in FIG. 11, control information needed to measure an OSNR is shared between a transmission node and a measurement node without intervention of the network management system 40.

In the examples depicted in FIGS. 10-11, control information is reported from a transmission node to a measurement node, but the invention is not limited to such a method. For example, the network management system 40 may determine a cycle of polarization scrambling. In this case, the network management system 40 reports the cycle of polarization scrambling to the transmission node and the measurement node.

Figure 12:
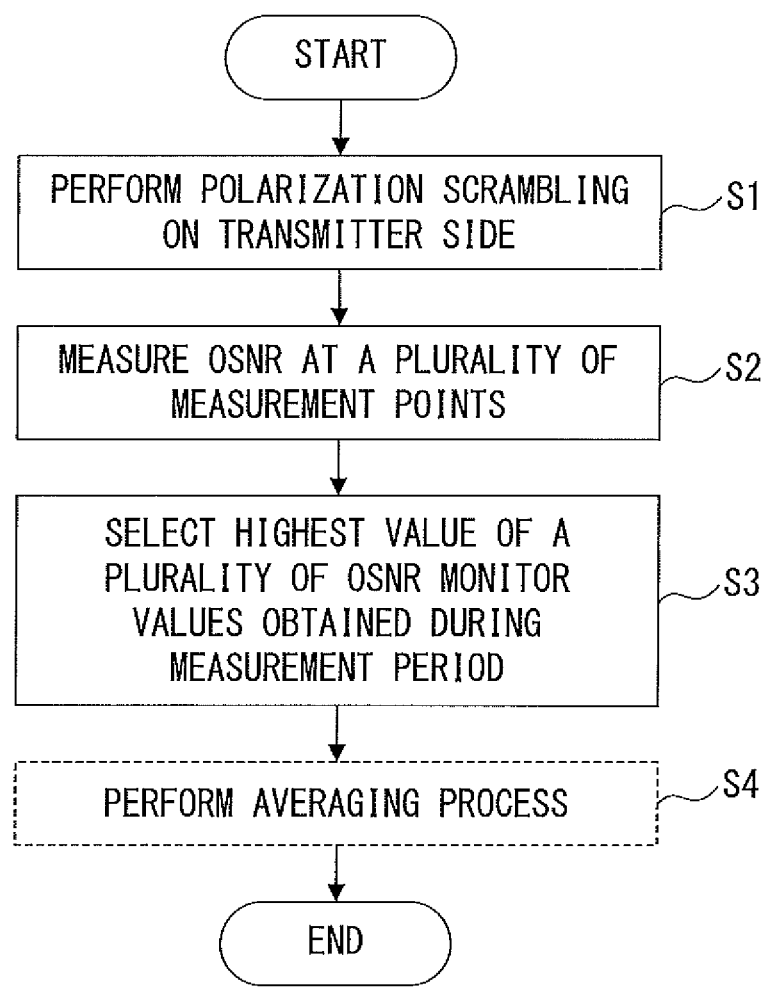
FIG. 12 is a flowchart illustrating an example of an OSNR measurement method.

FIG. 12 is a flowchart illustrating an example of an OSNR measurement method. The processes of this flowchart are performed when an instruction to start an OSNR measurement is provided from the network management system 40 to a transmission node and a measurement node.

In S1, the transmission node starts polarization scrambling. In one possible example, a polarization of an optical signal transmitted from the transmitter node rotates at a constant speed.

In S2, the OSNR monitor 1 of the measurement node measures an OSNR at a plurality of measurement points. In this case, the OSNR measuring unit 31 repeatedly measures an OSNR at specified time intervals so as to generate a plurality of OSNR monitor values. When the polarization of the optical signal rotates at a constant speed in accordance with polarization scrambling, time intervals at which an OSNR is measured are determined according to, for example, the rotation speed of the polarization. In one example, the measurement is performed 10-20 times during a period in which the polarization of the optical signal rotates by $\pi/2$. OSNR monitor values generated by the OSNR measuring unit 31 are sequentially stored in the storage unit 32.

In S3, the selector 33 selects a highest OSNR monitor value from the plurality of OSNR monitor values obtained during a designated measurement period. When the polarization of the optical signal rotates at a constant speed in accordance with polarization scrambling, the measurement period corresponds to, for example, a period in which the polarization of the optical signal rotates by $\pi/2$. The OSNR monitor value selected by the selector 33 is output as an OSNR measurement result.

An averaging process is performed when the OSNR monitor 1 includes the averaging unit 34 illustrated in FIG. 8. That is, in S4, the averaging unit 34 calculates the average of OSNR monitor values that are respectively selected by the selector 33 from a plurality of measurement periods. In this case, the average of the OSNR monitor values is output as an OSNR measurement result.

FIG. 13 is a flowchart illustrating another example of an OSNR measurement method. The measurement method depicted in FIG. 13 is based on a situation in which a polarization of an optical signal rotates at a constant speed in accordance with polarization scrambling.

In S11, the network management system 40 transmits to a measurement node a request message to perform an OSNR measurement. This message may be transmitted not only to the measurement node but also to a transmitter node. In S12, the measurement node makes a request for the transmitter node to perform polarization scrambling. In S13, the transmitter node starts polarization scrambling. In S14, the transmitter node reports the cycle or repetitive frequency of polarization scrambling to the measurement node. In the configuration depicted in FIG. 10, the communications in S12 and S14 are performed via the network management system 40; in the configuration depicted in FIG. 11, such communications are performed without intervention of the network management system 40.

The processes of S15-S16 are substantially the same as those of S2-S3 illustrated in FIG. 12. That is, the OSNR monitor 1 of the measurement node selects the highest value from a plurality of OSNR monitor values. In S17, the measurement node reports the OSNR measurement result obtained in S16 to the network management system 40.

FIG. 14 is a flowchart illustrating yet another example of an OSNR measurement method. In the measurement method depicted in FIG. 14, a polarization of an optical signal discretely changes in accordance with polarization scrambling.

The processes of S11-S12 in FIG. 14 are substantially the same as those in FIG. 13. That is, an OSNR measurement is started at a request from the network management system 40.

In S21, the transmitter node changes the state of the polarization of the optical signal. In this case, the transmitter node rotates the polarization of the optical signal by, for example, $\Delta\phi$ relative to the state thereof as of the immediately previous measurement. When the process of S21 is performed for the first time, the transmitter node sets the polarization of the optical signal to an initial state.

In S22, the transmitter node instructs the measurement node to measure an OSNR. In S23, the OSNR monitor 1 of the measurement node generates one OSNR monitor value by measuring an OSNR. That is, the OSNR monitor 1 generates an OSNR monitor value for the polarization controlled in S21.

In S24, the OSNR calculator 6 decides whether the number of times the OSNR measurement is performed has reached the number of trials C designated in advance. In one possible example, the number of trials C may belong to a range of 10 to 20. When the number of times the measurement is performed is smaller than the number of trials C, the process of the flowchart returns to S21. Simultaneously, the measurement node may make a request for the transmitter node to set a next polarization state. The processes of S21-S24 are repeatedly performed until the number of times the OSNR measurement is performed reaches the number of trials C. That is, the OSNR is measured C times. In this case, the polarization of the optical signal changes by $\Delta\phi$ each time in accordance with polarization scrambling. $\Delta\phi$ is, for example, $\pi/2C$.

When the number of times the OSNR measurement is performed reaches the number of trials C, the process of the flowchart shifts to S16. The processes of S16-S17 in FIG. 14 are substantially the same as those in FIG. 13. That is, the highest value of a plurality of OSNR monitor values is selected and reported to the network management system 40.

Another Embodiment

FIGS. 15A-15C illustrate variations of an OSNR monitor in accordance with the embodiment. The optical power monitor 3, the BPF 4, the AC power monitor 5, and the OSNR calculator 6 in FIGS. 15A-15C are substantially the same as those in FIG. 1, and thus descriptions thereof are omitted herein.

In the configuration depicted in FIG. 15A, an A/D converter 51 converts an electrical signal generated by the photodetector 2 into a digital signal. The digital signal represents a received optical signal. A DFT circuit 52 applies DFT (Discrete Fourier Transform) to the digital signal output from the A/D converter 51. Consequently, a frequency domain signal representing the received optical signal is generated. The DFT circuit 52 may be implemented by an FFT circuit. The frequency domain signal representing the received optical signal is guided to the optical power monitor 3 and the BPF 4.

In this configuration, the DFT circuit 52, the optical power monitor 3, the BPF 4, the AC power monitor 5, and the OSNR calculator 6 may be implemented by a processor system that performs digital processing. That is, the optical power monitor 3 calculates the intensity of the received optical signal using the frequency domain signal representing the received optical signal. The BPF 4 extracts a signal with a designated frequency component from the frequency domain signal representing the received optical signal. The AC power monitor 5 calculates the intensity of an AC component of the received optical signal using the signal extracted by the BPF 4. The OSNR calculator 6 calculates an OSNR according to the intensity of the received optical signal and the intensity of the AC component of the received optical signal.

In the configuration depicted in FIG. 15B, an OSNR may be measured for each wavelength channel of a WDM optical signal. That is, a wavelength tunable filter 53 selects a designated wavelength channel from a received WDM optical signal. The photodetector 2, the optical power monitor 3, the BPF 4, the AC power monitor 5, and the OSNR calculator 6 measure the OSNR of the selected wavelength channel.

In the configuration depicted in FIG. 15C, a received optical signal is split and guided to photodetectors 2a and 2b. The photodetectors 2a and 2b respectively convert the received optical signal into electrical signals. The optical power monitor 3 detects the power of the received optical signal according to the electrical signal output from the photodetector 2a. The BPF 4 and the AC power monitor 5 detect the intensity of an AC component of the received optical signal according to the electrical signal output from the photodetector 2b. The OSNR calculator 6 calculates an OSNR according to the intensity of the received optical signal and the intensity of the AC component of the received optical signal.

The configurations depicted in FIGS. 15A-15C may be combined in any manner unless a contradiction arises. For example, the wavelength tunable filter 53 may be provided on the input side of the configuration illustrated in FIG. 15A or FIG. 15C. In the configuration depicted in FIG. 15C, an A/D converter and a DFT circuit may be provided between the photodetector 2a and the optical power monitor 3, and an A/D converter and a DFT circuit may be provided between the photodetector 2b and the BPF 4.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical signal-to-noise ratio monitor comprising:
   a measuring unit that measures an optical signal-to-noise ratio of a polarization multiplexed optical signal, a polarization state of the polarization multiplexed optical signal changing with respect to time;
   a selector that selects, from a plurality of optical signal-to-noise ratios measured by the measuring unit at a plurality of different measurement timings within a designated measurement period, an optical signal-to-noise ratio that is higher than an average of the plurality of optical signal-to-noise ratios; and
   an output unit that outputs the optical signal-to-noise ratio selected by the selector,
   wherein when a polarization of the polarization multiplexed optical signal rotates at a constant speed, the measurement period is a period of time in which the polarization of the polarization multiplexed optical signal rotates by $\pi/2$ or greater.

2. The optical signal-to-noise ratio monitor according to claim 1, wherein the selector selects a highest optical signal-to-noise ratio from the plurality of optical signal-to-noise ratios.

3. The optical signal-to-noise ratio monitor according to claim 1, wherein the measuring unit measures the optical signal-to-noise ratio of the polarization multiplexed optical signal at ten or more different measurement timings within the measurement period.

4. The optical signal-to-noise ratio monitor according to claim 3, wherein the measuring unit measures the optical signal-to-noise ratio of the polarization multiplexed optical signal at twenty or less different measurement timings within the measurement period.

5. The optical signal-to-noise ratio monitor according to claim 1, further comprising an averaging unit that calculates an average of a plurality of optical signal-to-noise ratios respectively selected from a plurality of measurement periods by the selector,
wherein the output unit outputs the average of a plurality of optical signal-to-noise ratios calculated by the averaging unit.

6. An optical signal-to-noise ratio monitor, comprising:
   a measuring unit that measures an optical signal-to-noise ratio of a polarization multiplexed optical signal, a polarization state of the polarization multiplexed optical signal changing with respect to time;
   a selector that selects, from a plurality of optical signal-to-noise ratios measured by the measuring unit at a plurality of different measurement timings within a designated measurement period, an optical signal-to-noise ratio that is higher than an average of the plurality of optical signal-to-noise ratios; and
   an output unit that outputs the optical signal-to-noise ratio selected by the selector,
   wherein the measuring unit includes
      a photodetector that converts the polarization multiplexed optical signal into an electrical signal,
      a first detector that detects an intensity of the polarization multiplexed optical signal according to the electrical signal,
      a second detector that detects an intensity of an AC component of the polarization multiplexed optical signal according to the electrical signal, and
      a calculator that calculates an optical signal-to-noise ratio of the polarization multiplexed optical signal according to the intensity of the polarization multiplexed optical signal and the intensity of the AC component of the polarization multiplexed optical signal.

7. A method for measuring an optical signal-to-noise ratio, the method comprising:
   applying polarization scrambling to a polarization multiplexed optical signal so as to rotate a polarization of the polarization multiplexed optical signal at a constant speed;
   measuring an optical signal-to-noise ratio of the polarization multiplexed optical signal at a plurality of different measurement timings within a designated measurement period in which the polarization of the polarization multiplexed optical signal rotates by $\pi/2$ or greater;
   selecting, from a plurality of optical signal-to-noise ratios obtained by the measuring, an optical signal-to-noise ratio that is higher than an average of the plurality of optical signal-to-noise ratios; and
   outputting the selected optical signal-to-noise ratio.

8. The method for measuring an optical signal-to-noise ratio according to claim 7, further comprising: selecting a highest optical signal-to-noise ratio of the plurality of optical signal-to-noise ratios.

9. The method for measuring an optical signal-to-noise ratio according to claim 7, further comprising: calculating an average of a plurality of optical signal-to-noise ratios respectively selected from a plurality of measurement periods.

* * * * *